United States Patent
Tamaoka et al.

(10) Patent No.: US 8,324,776 B2
(45) Date of Patent: Dec. 4, 2012

(54) SPINDLE MOTOR INCLUDING AN ELECTRICALLY CONDUCTIVE ADHESIVE AND A NON-CONDUCTIVE ADHESIVE ARRANGED BETWEEN A BASE AND A BEARING UNIT

(75) Inventors: Takehito Tamaoka, Kyoto (JP); Tsuchitsugu Watanabe, Kyoto (JP); Takashi Yamamoto, Kyoto (JP)

(73) Assignee: Nidec Corporation, Kyoto (JP)

( * ) Notice: Subject to any disclaimer, the term of this patent is extended or adjusted under 35 U.S.C. 154(b) by 438 days.

(21) Appl. No.: 12/687,217

(22) Filed: Jan. 14, 2010

(65) Prior Publication Data

US 2010/0181875 A1      Jul. 22, 2010

(30) Foreign Application Priority Data

Jan. 16, 2009   (JP) .................................. 2009-007773

(51) Int. Cl.
    *H02K 5/167* (2006.01)
    *G11B 19/20* (2006.01)
(52) U.S. Cl. .................. 310/90; 360/99.08; 384/107
(58) Field of Classification Search ................ 310/90; 360/99.08; 384/100, 107, 113, 119, 120, 384/123, 124, 130
    See application file for complete search history.

(56) References Cited

U.S. PATENT DOCUMENTS

| | | | |
|---|---|---|---|
| 6,512,654 B2 | 1/2003 | Teshima | |
| 7,005,768 B2 * | 2/2006 | Tamaoka et al. | 310/90 |
| 7,088,023 B1 | 8/2006 | Gomyo et al. | |
| 7,495,862 B2 * | 2/2009 | Flores et al. | 360/99.08 |
| 8,174,788 B2 * | 5/2012 | Contreras et al. | 360/99.08 |
| 2002/0030926 A1 * | 3/2002 | Teshima | 360/99.08 |
| 2009/0190253 A1 * | 7/2009 | Contreras et al. | 360/99.08 |
| 2010/0181875 A1 * | 7/2010 | Tamaoka et al. | 310/425 |
| 2012/0104889 A1 * | 5/2012 | Kim et al. | 310/90 |

FOREIGN PATENT DOCUMENTS

| | | |
|---|---|---|
| JP | 6-225495 A | 8/1994 |
| JP | 2000-82252 A | 3/2000 |
| JP | 2003-56556 A | 2/2003 |
| JP | 2003-214432 A | 7/2003 |
| JP | 2003-294050 A | 10/2003 |
| JP | 2004-289982 A | 10/2004 |
| JP | 2005-114106 A | 4/2005 |
| JP | 2006187066 | * 7/2006 |
| JP | 2007274755 | * 10/2007 |

OTHER PUBLICATIONS

Machine Translation of JP02006187066, "motor and recording disk drive", Jul. 13, 2006. Yonei et al.*

* cited by examiner

*Primary Examiner* — Karl Tamai

(74) *Attorney, Agent, or Firm* — Keating & Bennett, LLP

(57) ABSTRACT

A spindle motor includes a shaft arranged in an upward/downward direction along a central axis; a base member including a substantially cylindrical holder portion arranged around the central axis; a bearing unit arranged radially inward of the holder portion; and a rotating portion arranged above the base member to rotate about the central axis. The rotating portion preferably includes a mounting surface on which a disk is to be mounted. An adhesive containing an electrically conductive material and an adhesive containing an externally stimulated curing material and/or an anaerobic curing material are arranged in a clearance space defined between an inner circumferential surface of the holder portion and an outer circumferential surface of the bearing unit. The adhesive containing the electrically conductive material is arranged above the adhesive containing the externally stimulated curing material and/or the anaerobic curing material.

10 Claims, 7 Drawing Sheets

SPINDLE MOTOR INCLUDING AN ELECTRICALLY CONDUCTIVE ADHESIVE AND A NON-CONDUCTIVE ADHESIVE ARRANGED BETWEEN A BASE AND A BEARING UNIT

BACKGROUND OF THE INVENTION

1. Field of the Invention

The present invention relates to a spindle motor, a disk drive apparatus using the spindle motor, and a method of manufacturing the spindle motor.

2. Description of the Related Art

Hard disk apparatuses and optical disk apparatuses are typically provided with a spindle motor arranged to rotate a disk about a central axis. The spindle motor includes a stationary portion, which is fixed to a housing of the apparatus, and a rotating portion, which is arranged to rotate with the disk mounted thereon. The spindle motor is arranged to produce torque in a rotation direction centered on the central axis, due to magnetic flux generated between the stationary portion and the rotating portion. In this manner, the rotating portion and the disk mounted on the rotating portion are rotated relative to the stationary portion.

The stationary portion and the rotating portion of the spindle motor are connected to each other via a bearing such that they are rotatable relative to each other. The bearing includes a bearing member on a stationary portion side (e.g., a bearing sleeve) and a bearing member on a rotating portion side (e.g., a shaft). The bearing member on the stationary portion side is, for example, inserted inside a tubular sleeve support member provided in a base frame of the stationary portion, and fixed to the sleeve support member via an adhesive.

A related-art spindle motor including a bearing as described above is disclosed, for example, in JP-A 2005-114106.

Regarding the related-art spindle motor, in a process of assembling the spindle motor, the adhesive is first applied to an inner circumferential surface of the sleeve support member in the base frame, and thereafter the bearing sleeve is inserted inside an inner circumference of the sleeve support member. Then, the adhesive is heated and cured, so that the sleeve support member and the bearing sleeve are fixed to each other. Thereafter, in order to establish electrical connection between the sleeve support member and the bearing sleeve, an electrically conductive adhesive is applied to be in electrical contact with the sleeve support member and the bearing sleeve, and cured. In the above-described method, however, the different types of adhesives are applied and cured in two separate steps, and therefore, separate pieces of equipment need be prepared for the two steps, and the assembling of the spindle motor takes much time.

SUMMARY OF THE INVENTION

According to a first preferred embodiment of the present invention, a spindle motor preferably includes a shaft arranged in an upward/downward direction along a central axis; a base member including a substantially cylindrical holder portion arranged around the central axis; a bearing unit arranged radially inward of the holder portion; and a rotating portion arranged above the base member to rotate about the central axis. The rotating portion includes a mounting surface on which a disk is to be mounted.

An adhesive containing an electrically conductive material and an adhesive containing an externally stimulated curing material and/or an anaerobic curing material, for example, are preferably arranged in a clearance space defined between an inner circumferential surface of the holder portion and an outer circumferential surface of the bearing unit. The adhesive containing the electrically conductive material is arranged above the adhesive containing the externally stimulated curing material and/or the anaerobic curing material.

The spindle motor according to the first preferred embodiment overcomes problems with the related-art spindle motors. Examples of such problems that are overcome include a problem in which the adhesive containing the electrically conductive material arranged at or near a lower opening portion of the clearance space between the holder portion of the base member and the bearing unit protruding downward from the lower opening portion of the clearance space.

Also, the spindle motor according to the first preferred embodiment overcomes a problem of the aforementioned protruding adhesive coming into contact with another electronic component to cause a short circuit, and is arranged to ensure excellent electrical connection between the holder portion and the bearing unit.

Also, a fixing adhesive and an electrically conductive adhesive can be applied or cured simultaneously in a single process. The fixing adhesive is an adhesive used to fix the base member and the bearing unit to each other. Therefore, the assembling of the spindle motor according to the first preferred embodiment takes less time and can be accomplished in fewer steps than that of the related-art spindle motors.

According to a second preferred embodiment of the present invention, there is provided a method of manufacturing a spindle motor. The spindle motor according to the second preferred embodiment preferably includes a shaft arranged in an upward/downward direction along a central axis; a base member including a substantially cylindrical holder portion arranged about the central axis; a bearing unit arranged radially inward from the holder portion; and a rotating portion including a mounting surface on which a disk is to be mounted, the rotating portion arranged above the base member to rotate about the central axis.

The method of manufacturing the spindle motor preferably includes steps a), b), and c) as described below.

In step a), an adhesive containing an electrically conductive material and an adhesive containing an externally stimulated curing material and/or an anaerobic curing material, for example, are applied to an inner circumferential surface of the holder portion and/or an outer circumferential surface of the bearing unit. At least one of the two adhesives has a thermosetting property.

In step b), the bearing unit is moved in an axial direction relative to the holder portion to insert the bearing unit inside the holder portion.

In step c), the adhesive containing the electrically conductive material and the adhesive containing the externally stimulated curing material and/or the anaerobic curing material are heated to cure at least one of the two adhesives.

In accordance with the method of manufacturing the spindle motor according to the second preferred embodiment, in a process of inserting the bearing unit inside the holder portion, the adhesive containing the electrically conductive material and the adhesive containing the externally stimulated curing material and/or the anaerobic curing material, at least one of which has the thermosetting property, are arranged to intervene in a clearance space between the holder portion and the bearing unit, and it is possible to cure the adhesive(s) having the thermosetting property by a single heat treatment. Therefore, the assembling of the spindle motor according to the second preferred embodiment takes less time and can be accomplished in fewer steps than that of the related-art spindle motors.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, preferred embodiments of the present invention will be described with reference to the accompanying drawings. It is assumed herein that an upward/downward direction is defined along a central axis A, and that a side on which a rotating portion 4 is arranged and a side on which a stationary portion 3 is arranged in relation to each other are defined as an upper side and a lower side, respectively. The shape of each member and relative positions of different members will be described based on this assumption. Note that these definitions regarding the upward/downward direction are merely for the sake of convenience in description, and should not be construed to restrict in any way the orientation of a spindle motor or a disk drive apparatus according to any preferred embodiment of the present invention when they are actually installed in a device.

Figure 1:
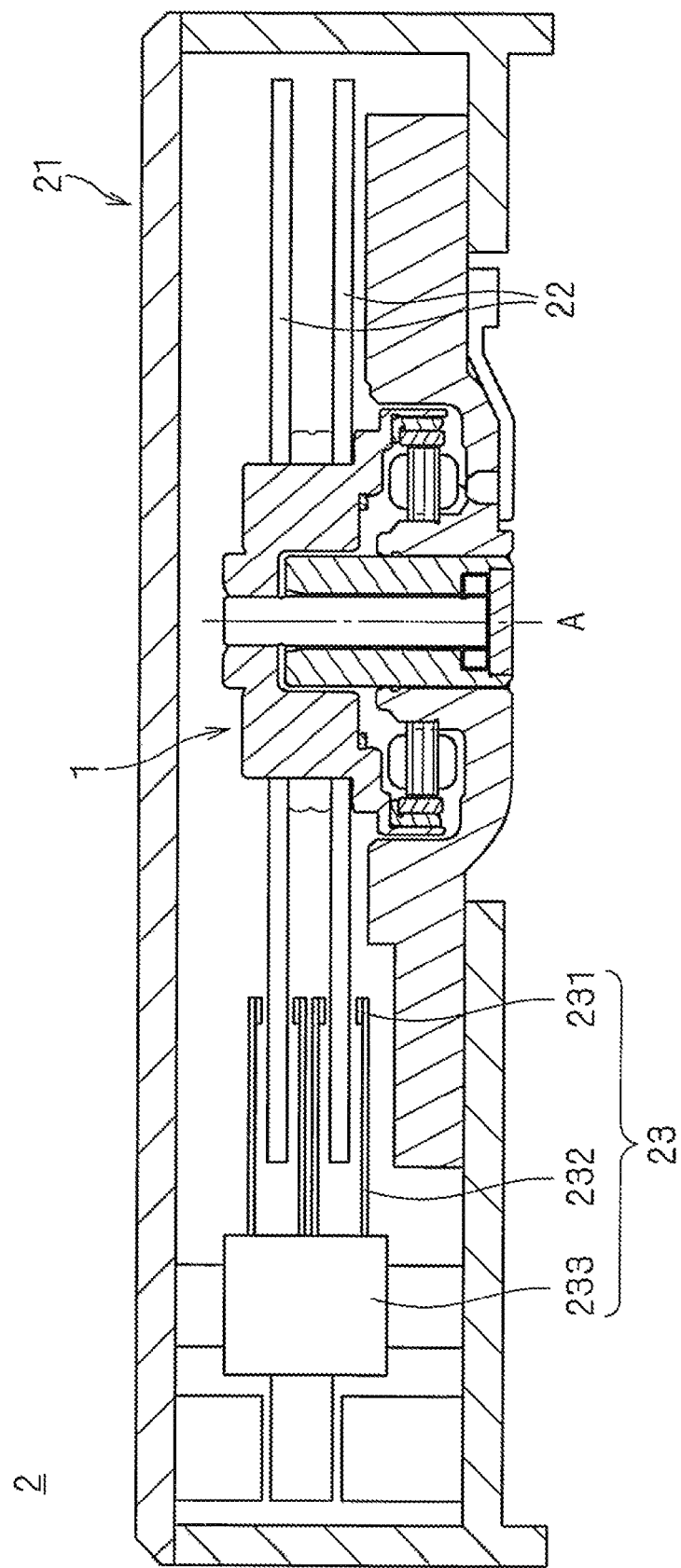
FIG. 1 is a cross-sectional view of a disk drive apparatus according to a preferred embodiment of the present invention taken along a plane including a central axis.

FIG. 1 is a cross-sectional view of a disk drive apparatus 2 according to a preferred embodiment of the present invention, taken along a plane including the central axis. The disk drive apparatus 2 is a hard disk apparatus arranged to rotate two magnetic disks 22 and at the same time read information from the magnetic disks 22 and/or write information to the magnetic disks 22.

As illustrated in FIG. 1, the disk drive apparatus 2 preferably includes an apparatus housing 21, the two magnetic disks (hereinafter referred to simply as "disks") 22, an access portion 23, and a spindle motor 1. The access portion 23 uses an actuator mechanism 233 to move four arms 232 along the disks 22 to allow four head portions 231 to make an access to a desired location in either of the rotating disks 22, thereby performing a read and/or a write of information on a recording surface of the disk 22. Note that the number of magnetic disks is not limited to two in the present invention. Either one or any number of multiple magnetic disks may be mounted on the spindle motor, in other preferred embodiments. Similarly, the number of arms and head portions is not limited to four in the present invention and can be any number.

Figure 2:
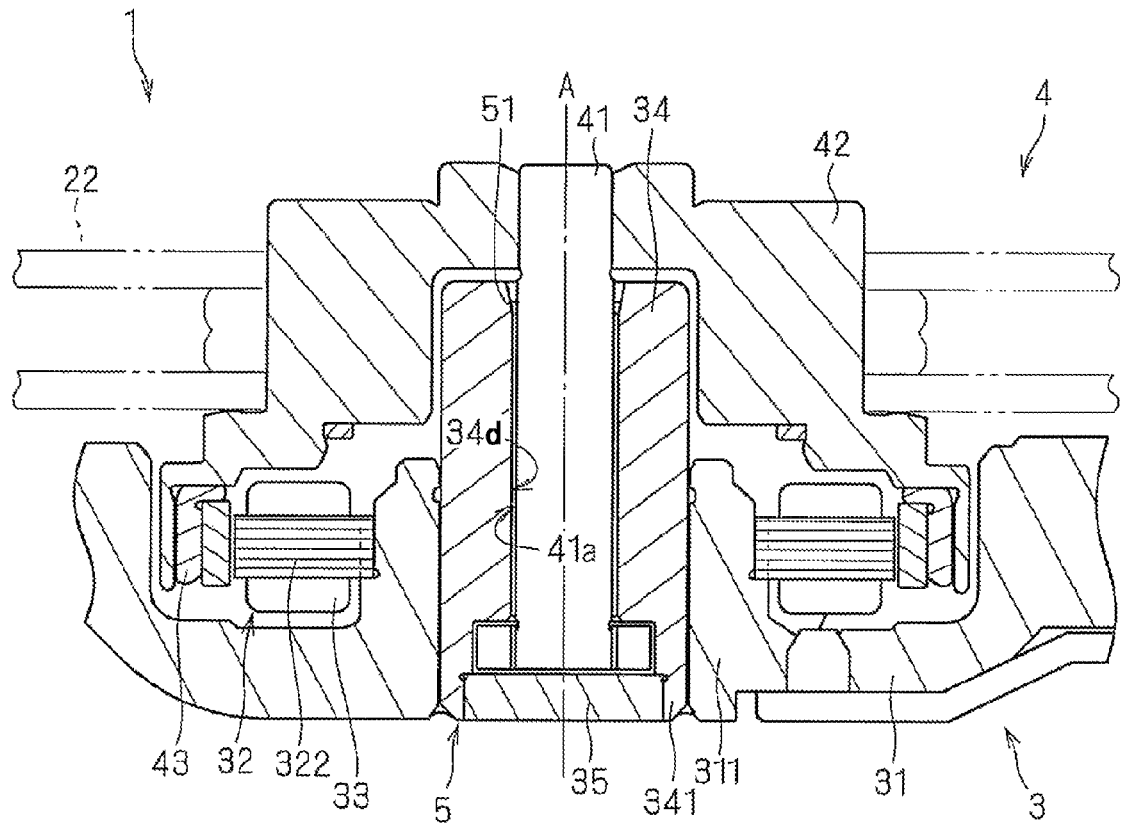
FIG. 2 is a cross-sectional view of a spindle motor according to a preferred embodiment of the present invention taken along a plane including the central axis.

Next, the structure of the above-described spindle motor 1 will now be described in detail below. FIG. 2 is a cross-sectional view of the spindle motor 1 taken along a plane including the central axis. As illustrated in FIG. 2, the spindle motor 1 preferably includes the stationary portion 3, which is fixed to the apparatus housing 21 of the disk drive apparatus 2, and the rotating portion 4, which is arranged to rotate about the central axis A with the disks 22 mounted thereon.

First, the structure of the stationary portion 3 will be described below. The stationary portion 3 preferably includes a base member 31, a stator core 32, coils 33, and a sleeve 34.

The base member 31 is fixed to the apparatus housing 21 (see FIG. 1), and preferably made of a metallic material, such as aluminum, for example. The base member 31 preferably includes a substantially cylindrical holder portion 311 protruding in an axial direction around the central axis A. Note that the terms "axial direction", "axial", and "axially" as used herein refer to directions along the central axis A as appropriate. The stator core 32 is preferably attached to a radially outer surface of the holder portion 311. Note that the terms "radial direction", "radial", and "radially" as used herein refer to directions perpendicular to the central axis A as appropriate. The stator core 32 includes a plurality of tooth portions 322 protruding radially outward. A lead wire is preferably wound around each of the tooth portions 322 to define the coil 33. The lead wire leading from the coil 33 is passed through a through hole defined in the base member 31 to be connected to a flexible circuit board attached to a lower surface of the base member 31, to establish electrical connection.

Note that the base member 31 may be defined by a plurality of components in other preferred embodiments. For example, the holder portion 311 may be a separate member from the base member 31. Also, the base member 31 may be an integral portion of the apparatus housing 21.

The sleeve 34 is arranged to be used as a component of a bearing unit 5. The sleeve 34 is preferably a substantially cylindrical member arranged radially outward of an outer circumference of a shaft 41, and preferably made of a metallic material, such as stainless steel, for example.

Figure 6:
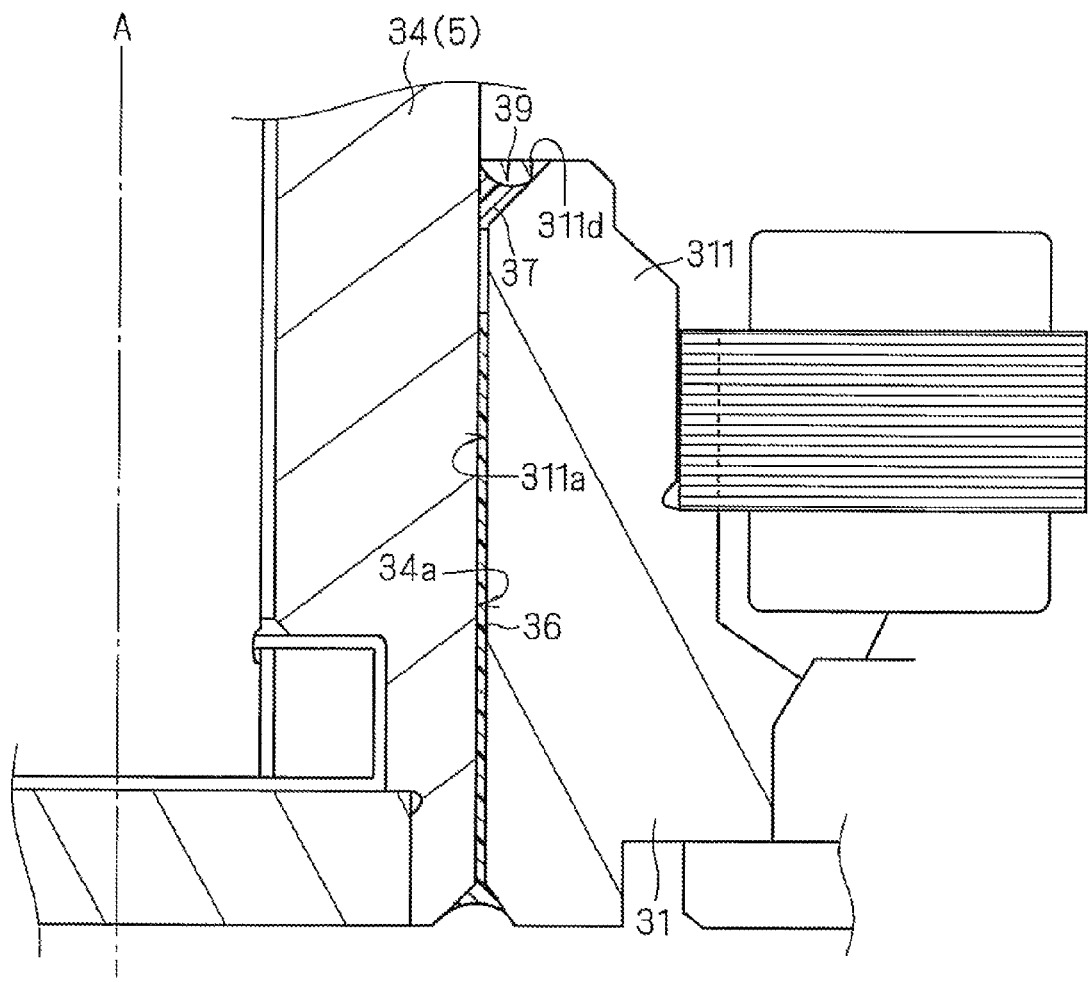
FIG. 6 is an enlarged cross-sectional view of a variation of the spindle motor according to a preferred embodiment of the present invention taken along a plane including the central axis, illustrating a portion where a base member and a sleeve are adhered to each other.

The sleeve 34 is inserted, from above, inside the holder portion 311 of the base member 31, and fixed to the holder portion 311 via an adhesive 36 as shown in FIG. 6 and further described below. In addition, a cap 35 is fixed to a lower surface of the sleeve 34 to seal a lower-end opening of the sleeve 34. A projecting portion 341 projecting downward is arranged on the lower surface of the sleeve 34 along an outer circumferential edge thereof. In addition, the cap 35 arranged to seal the lower-end opening of the sleeve 34 is fixed to the projecting portion 341.

The cap 35 is preferably made of a metallic material, such as stainless steel or aluminum, or a resin material, for example.

A minute clearance space (which is, for example, about several micrometers wide) defined between an inner circumferential surface 34d of the sleeve 34 and an outer circumferential surface 41a of the shaft 41, and a minute clearance space defined between a lower surface of the shaft 41 and an upper surface of the cap 35, are preferably continuously filled with lubricating oil 51.

The sleeve 34, the cap 35, the shaft 41, and the lubricating oil 51 define the bearing unit 5, which is a mechanism to support the stationary portion 3 and the rotating portion 4 such that they are rotatable about the central axis A relative to each other.

Next, the structure of the rotating portion 4 of the spindle motor 1 will now be described below. The rotating portion 4 preferably includes the shaft 41, a hub 42, and a rotor magnet 43.

The shaft 41 is arranged to extend along the central axis A, inserted inside the sleeve 34 (i.e., in a bearing hole), and supported therein to be rotatable relative to the sleeve 34.

The hub 42 includes a mounting surface on which the disks 22 are mounted. The hub 42 is fixed to the shaft 41 and arranged to rotate about the central axis A together with the shaft 41. The hub 42 is preferably made of a metallic material, such as aluminum or ferromagnetic or nonmagnetic stainless steel, for example. The hub 42 is preferably arranged above the base member 31 to cover the stator core 32, the coils 33, and the sleeve 34 from above.

The rotor magnet 43 is preferably attached to the hub 42. The rotor magnet 43 is in the shape of a ring, and encircles the central axis A. An inner circumferential surface of the rotor magnet 43 defines a pole surface on which the north and south poles alternate with each other, and is radially opposed to an outer circumferential surface of each of the tooth portions 322 of the stator core 32.

In the spindle motor 1 as described above, when a drive current is applied to the coils 33 of the stationary portion 3, radial magnetic flux is generated around each of the tooth portions 322 of the stator core 32. Then, circumferential torque is produced by the action of the magnetic flux between each tooth portion 322 and the rotor magnet 43, so that the rotating portion 4 rotates about the central axis A relative to the stationary portion 3. The two disks 22 mounted on the hub 42 also rotate about the central axis A together with the shaft 41 and the hub 42.

Figure 3:
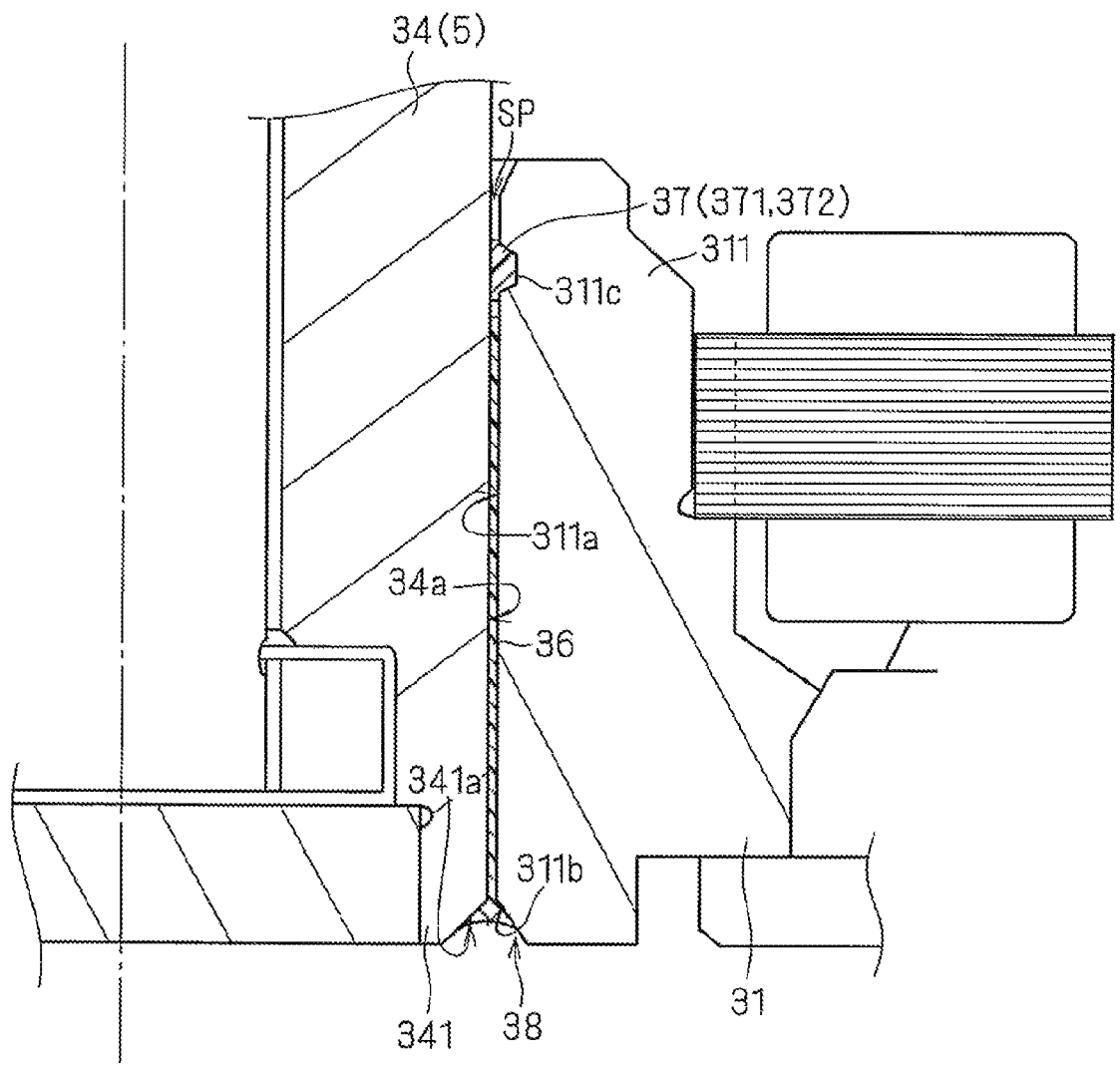
FIG. 3 is an enlarged cross-sectional view of the spindle motor according to a preferred embodiment of the present invention taken along a plane including the central axis, illustrating a portion where a base member and a sleeve are adhered to each other.

FIG. 3 is an enlarged cross-sectional view of the spindle motor as manufactured by a manufacturing method according to the present preferred embodiment taken along a plane including the central axis, illustrating a portion where the base member and the sleeve are adhered to each other. The method of manufacturing the spindle motor will be described later.

As illustrated in FIG. 3, the bearing unit 5 including the sleeve 34 is fixed to an inside of the holder portion 311 of the base member 31 via the fixing adhesive 36. Hereinafter, the fixing adhesive will be referred to simply as the adhesive 36.

The adhesive 36 is arranged in a minute clearance space SP between an inner circumferential surface 311a of the holder portion 311 and an outer circumferential surface 34a of the sleeve 34. The bearing unit 5 including the sleeve 34 is firmly fixed to the holder portion 311 via the adhesive 36. The adhesive 36 is applied to the inner circumferential surface 311a of the holder portion 311 within a range from a lower inclined surface 311b (which will be described later) of the holder portion 311 to a lower vicinity of a groove portion 311c.

The adhesive 36 used in the present preferred embodiment preferably is a thermosetting epoxy adhesive as an example of adhesives containing an externally stimulated curing material. Note that the adhesive 36 used in the present preferred embodiment may not necessarily have a thermosetting property, but may have a different curing property. For example, the adhesive 36 may be a visible light curing adhesive, a UV-curing adhesive, an adhesive containing an anaerobic curing material, or the like. Note, however, that thermosetting adhesives generate less outgas than the other adhesives, and that in particular, thermosetting adhesives containing an epoxy resin as their main ingredient have high adhesive strength. Therefore, it is preferable that a thermosetting adhesive be used as the adhesive 36.

In the case where an anaerobic adhesive is used, an additional use of a primer which plays an auxiliary role for applying adhesives will contribute to improving the adhesive strength of the anaerobic adhesive, and also in accelerating the curing process to shorten an overall curing time. Note that the adhesive 36 may or may not have electrical conductivity.

Next, the structure of a lower end portion of the minute clearance space SP and its vicinity will now be described below. As illustrated in FIG. 3, the minute clearance space SP has a lower opening portion 38 which is open downward. Around the lower opening portion 38 of the minute clearance space SP, the radial dimension of the minute clearance space SP gradually increases as it moves downward. In other words, a sleeve lower inclined surface 341a is provided on an outer circumferential edge of a lower end portion of the projecting portion 341, and the holder portion lower inclined surface 311b is provided on an inner circumferential edge of a lower end portion of the inner circumferential surface 311a of the holder portion 311, so that a tapered structure is defined around the lower opening portion 38 of the minute clearance space SP.

Because of the above-described structure, the adhesive 36 which is arranged in the lower opening portion 38 of the minute clearance space SP is retained within the lower opening portion 38 while forming a meniscus liquid surface at a position where surface tension and external atmospheric pressure are balanced. Therefore, downward leakage of the adhesive 36 is prevented, and leakage of the adhesive 36 out of the spindle motor 1 is also prevented.

Outgas, which is contained in minuscule amounts in the adhesive 36, flows from a side with a higher capillary force (where the width of the clearance space is smaller) to a side with a lower capillary force (where the width of the clearance space is greater). Therefore, differences in the capillary force produce an effect of discharging the outgas, accelerating the discharge of the outgas through the lower opening portion 38.

Moreover, the adhesive 36 hardened within the lower opening portion 38 contributes to fixing the sleeve 34 and the holder portion 311 to each other both axially and radially.

In the present preferred embodiment, in addition to the above-described adhesive 36 arranged to fix the sleeve 34 and the holder portion 311 to each other, an electrically conductive adhesive 37 is arranged between the inner circumferential surface 311a of the holder portion 311 and the outer circumferential surface 34a of the sleeve 34 in order to prevent the sleeve 34 from becoming electrically charged. Note that the electrically conductive adhesive 37 is an adhesive as an example of adhesives containing an electrically conductive material.

Here, the electrically conductive adhesive 37 will now be described below. The electrically conductive adhesive 37 preferably contains a large number of electrically conductive particles (i.e., electrically conductive components) 371, which are electrically conductive fillers having electrical conductivity, and an adhesive material (i.e., a retaining component) 372 used to adhere the inner circumferential surface 311a of the holder portion 311 and the outer circumferential surface 34a of the sleeve 34 to each other. The large number of electrically conductive particles (i.e., the electrically conductive components) 371 are dispersed in the adhesive material (i.e., the retaining component) 372.

The electrically conductive particles 371 according to the present preferred embodiment are preferably metallic particles which are in solid form at ordinary temperatures and excellent in electrical conductivity and stability. Examples of such metallic particles include particles of one or more metallic materials selected from the group consisting of Ag, Pd, Ni, Au, Cu, C, Pt, Fe, and Ti, and those of an alloy having any of these metallic materials as its primary element, for example. The electrically conductive metallic particles may be composed either of a single type of particles or of a plurality of types of particles. The electrically conductive particles 371 may have any shape. Possible examples of the shape of the electrically conductive particles 371 include the shape of a sphere, the shape of an oval, the shape of a spindle, the shape of a disc, the shape of a squared board, the shape of a rectangular column, the shape of a cylinder, the shape of a flake, the shape of a fiber, and any other desirable indeterminate form. Also, the electrically conductive particles 371 may assume the form of agglomerated particles, each of which is composed of a cluster of a large number of primary particles. If the particle size of the electrically conductive particles 371 were too large, the electrically conductive particles 371 would tend to be easily separated from an adhesive resin binder, i.e., the adhesive material 372. Therefore, the maximum particle diameter of the electrically conductive particles 371 is, for example, equal to or less than approximately 30 μm, preferably equal to or less than approximately 15 μm, and more preferably equal to or less than approximately 10 μm. The electrically conductive particles 371 may have any minimum particle diameter. For example, the electrically conductive particles 371 may be nanoparticles.

The adhesive material 372 preferably is an adhesive resin binder, is preferably in liquid form at ordinary temperatures, and serves as a binder of the electrically conductive particles 371. The adhesive material 372 acts to convert the electrically conductive particles in powder form into a paste, for example.

In terms of workability, hardenability, adhesiveness to an electrode or the like, mechanical strength after hardening, and so on, the most preferred adhesive resin binder is generally a binder having a thermosetting epoxy resin as its base resin. The epoxy resin may be composed either of a single type of resin or of a mixture of two or more types of resin.

Note that the adhesive resin binder is generally composed of an adhesive resin and a curing agent therefor, but may additionally contain an adhesion accelerating agent, a reactive diluent, or the like, as necessary. As the curing agent, any material that is capable of being stored stably for a long time at room temperature or below may be applied. Note, however, that in the case where the adhesive resin is an epoxy resin, the curing agent should be a material that reacts with the epoxy resin quickly to cure the epoxy resin at the time of heating.

Also, the adhesive resin binder may preferably be either a thermoplastic resin, or composed of a mixture of a thermoplastic resin and a thermosetting resin. As the thermoplastic resin, a phenoxy resin may be applied, for example.

The adhesive material 372 according to the present preferred embodiment contains a thermosetting resin, which acts as the adhesive resin binder, and a curing agent for curing the thermosetting resin. After the electrically conductive adhesive 37 is applied to a space between two structural members, the thermosetting resin as the binder is cured, so that the two structural members are joined to each other by the cured resin, resulting in strength. Contraction due to the curing of the thermosetting resin results in the large number of electrically conductive particles 371 becoming closer to one another, resulting in electrical conductivity.

The electrically conductive adhesive 37 according to the present preferred embodiment preferably contains an antioxidant. The antioxidant acts to inhibit oxidation of the electrically conductive metallic particles when the electrically conductive adhesive 37 is stored or subjected to heat curing, and also acts to reduce a reduction in adhesive strength or electrical conductivity due to oxidative degradation of a thermosetting/adhesive resin, such as an epoxy resin, at the time of heat curing. Moreover, the electrically conductive adhesive 37 according to the present preferred embodiment may contain other additives. Examples of such additives include a pigment, a flexibilizer, a thixotropic agent, a filler, thermally conductive particles, and other suitable materials.

The electrically conductive adhesive 37 can be arranged at a single location or at any number of a plurality of locations circumferentially spaced from each other in the groove portion 311c, between the inner circumferential surface 311a of the holder portion 311 and the outer circumferential surface 34a of the sleeve 34. This arrangement establishes electrical connection between the sleeve 34 and the holder portion 311 of the base member 31 to allow an electric charge generated in the rotating portion 4 or the sleeve 34 to escape to the base member 31. This prevents the sleeve 34 and the rotating portion 4 from becoming excessively charged, and thereby prevents damage to either of the disks 22 due to an excessive electrical charge that could lead to an electrostatic discharge damage of any of the head portions 231.

In the present preferred embodiment, a two-part epoxy, electrically conductive adhesive, which generates relatively little outgas, is applied as the electrically conductive adhesive 37, for example.

Notice here that if the electrically conductive adhesive 37 were merely arranged in the minute clearance space SP, the electrically conductive adhesive 37 might be separated into the electrically conductive components 371 and the retaining component 372 when the sleeve 34 is inserted in the inner circumference of the holder portion 311. The radial dimension of the minute clearance space SP between the outer circumferential surface 34a of the sleeve 34 and the inner circumferential surface 311a of the holder portion 311 is smaller than the particle size of the electrically conductive particles 371, i.e., the electrically conductive components. Therefore, during the insertion of the sleeve 34, the electrically conductive particles 371 would become tangled with one another. In addition, when the sleeve 34 is inserted, a tangled group of electrically conductive particles 371 might be pushed downward by a neighborhood of a bottom surface of the sleeve 34. Also, the tangled group of electrically conductive particles 371 might become stuck in the minute clearance space SP.

Thus, the electrically conductive components 371 and the retaining component 372 would be separated from each other to cause a failure in conduction, leading to the aforementioned problems such as the damage of the disks 22. In order to prevent such a problem, the groove portion 311c is preferably provided on the inner circumferential surface 311a of the holder portion 311. The groove portion 311c is defined by one or more radially outward recesses arranged in a circumferential direction or by a radially outward recess extending continuously to cover the circumference of the inner circumferential surface 311a. The radial dimension of the groove portion 311c is greater than the maximum particle diameter of the electrically conductive particles 371.

For example, in the case where the maximum particle diameter of the electrically conductive particles 371 is approximately 30 μm, it is preferable that the radial dimension of the groove portion 311c be in the range of approximately 30 μm to approximately 300 μm, and that the axial dimension of the groove portion 311c be approximately 100 μm. In this case, the electrically conductive adhesive 37 will be retained within the groove portion 311c or at its neighborhood without being separated into the electrically conductive components 371 and the retaining component 372. This leads to a more secure electrical connection between the holder portion 311 of the base member 31 and the bearing unit 5 including the sleeve 34, resulting in excellent electrical connection between the two members. This allows static electricity produced on any of the head portions 231 by friction between air and an associated one of the disks 22 to be discharged, to prevent the electrostatic discharge damage of any of the head portions 231 of the disk drive apparatus 2.

As to the axial position of the groove portion 311c on the inner circumferential surface 311a of the holder portion 311, the groove portion 311c is arranged above the lower surface of the holder portion 311. Preferably, the groove portion 311c is arranged closer to the upper surface than to the lower surface of the holder portion 311. More preferably, the groove portion 311c is arranged slightly below the upper surface of the holder portion 311. This leads to maximizing an area stretching across the inner circumferential surface 311a from the holder portion lower inclined surface 311b up to the groove portion 311c, where the adhesive 36 intervenes between the inner circumferential surface 311a and the outer circumferential surface 34a to adhere them to each other, and thereby increasing the adhesive strength between the holder portion 311 and the sleeve 34. The electrically conductive adhesive 37 may slightly overflow the groove portion 311c.

As described above, the adhesive 36 and the electrically conductive adhesive 37 intervene in the minute clearance space SP between the inner circumferential surface 311a of the holder portion 311 of the base member 31 and the outer circumferential surface 34a of the sleeve 34, and the electrically conductive adhesive 37 is arranged above the adhesive 36. Since the electrically conductive adhesive 37 is arranged above the adhesive 36, an upper side of the adhesive 36 is sealed by the electrically conductive adhesive 37 to prevent upward leakage of the outgas within the adhesive 36.

Since the electrically conductive adhesive 37 is arranged within the minute clearance space SP and/or within the groove portion 311c or at its neighborhood, the electrically conductive adhesive 37 hardly comes into contact with external air, and therefore hardly undergoes deterioration. In particular, deterioration of the electrically conductive particles 371 can be prevented.

Moreover, the above-described arrangement contributes to avoiding a problem in related-art spindle motors in which the electrically conductive adhesive protrudes downward from the lower opening portion. In this related-art spindle motor, the protruding electrically conductive adhesive may come into contact with another electronic component to cause a short circuit. The spindle motor 1 according to the present preferred embodiment is free of this problem.

Furthermore, even in the case where the radial dimension of the minute clearance space SP is nearly zero, since the electrically conductive adhesive 37 can be retained within the groove portion 311c, the insertion of the sleeve 34 does not involve the electrically conductive adhesive 37 being drawn downward out of the groove portion 311c.

Furthermore, the groove portion 311c can also be used as a mark of a location to which the electrically conductive adhesive 37 is to be applied.

In view of coefficients of thermal expansion of the components of the spindle motor 1, the adhesive tends to expand more easily than any other component of the spindle motor 1. In related-art spindle motors, the electrically conductive adhesive is applied to a location at or near the lower opening portion between the inner circumferential surface of the holder portion and the outer circumferential surface of the sleeve, and heat that is generated while the disk drive apparatus is driven may cause the electrically conductive adhesive to expand and be torn off, causing a failure in conduction.

On the other hand, in the spindle motor 1 according to the present preferred embodiment, the electrically conductive adhesive 37 is retained within the groove portion 311c, and therefore, influence of thermal expansion is not significant even when the disk drive apparatus 2 is driven and heated to a high temperature. Therefore, as compared with the related-art spindle motors, the spindle motor 1 according to the present preferred embodiment is less likely to suffer problems such as that of the failure in conduction as a result of the tearing off of the electrically conductive adhesive due to the thermal expansion.

Furthermore, in the related-art spindle motors, the electrically conductive adhesive is applied across a wide range, and therefore, the influence of the thermal expansion is significant. Therefore, if the application of the electrically conductive adhesive is done in a poor manner, a failure in conduction may occur during a heat shock test or the like. In contrast, in the present preferred embodiment, the electrically conductive adhesive 37 is applied only across a narrow range within the groove portion 311c, and therefore, the influence of the thermal expansion is not significant. Therefore, the aforementioned problem that may occur with the related-art spindle motors can be prevented, resulting in improved workability for an operator. Furthermore, as compared with the related-art spindle motors, the electrically conductive adhesive 37 is required in smaller amounts to ensure conduction. Therefore, the spindle motor 1 according to the present preferred embodiment is superior to the related-art spindle motors in terms of cost as well.

Figure 4:
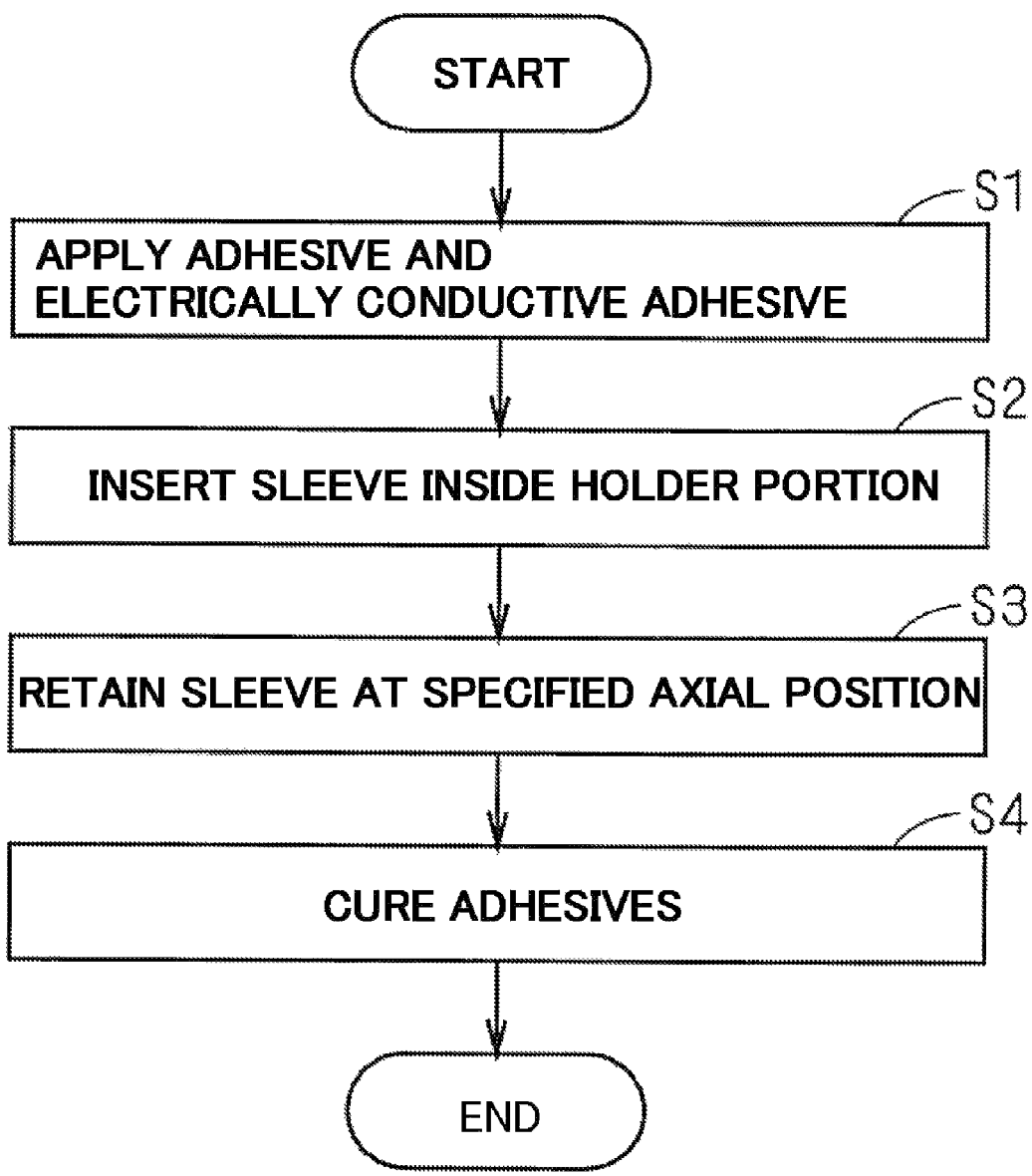
FIG. 4 is a flowchart illustrating a procedure of joining a hub assembly and a base assembly to each other in accordance with a preferred embodiment of the present invention.

When the spindle motor 1 as described above is manufactured, an assembly preferably including the sleeve 34, the cap 35, the shaft 41, the hub 42, and the rotor magnet 43 (hereinafter referred to as a "hub assembly 6") and an assembly preferably including the base member 31, the stator core 32, and the coils 33 (hereinafter referred to as a "base assembly 7") are prepared. Then, the hub assembly 6 and the base assembly 7 are assembled together. Hereinafter, a procedure for assembling the hub assembly 6 and the base assembly 7 together will be described with reference to a flowchart of FIG. 4 and diagrams of FIGS. 3 and 5.

When the hub assembly 6 and the base assembly 7 are assembled together, the adhesive 36 is first applied to the inner circumferential surface 311a of the holder portion 311 of the base member 31 (step S1). The adhesive 36 can be applied within the range from the holder portion lower inclined surface 311b of the holder portion 311 to the lower vicinity of the groove portion 311c. In the present preferred embodiment, the adhesive 36 is applied to a location below and in close vicinity to the groove portion 311c. This manner of applying the adhesive 36 contributes to increasing the adhesive strength between the sleeve 34 and the holder portion 311.

Next, the electrically conductive adhesive 37 is applied into the groove portion 311c and/or to a location above the groove portion 311c. Since the electrically conductive adhesive 37 is applied merely to achieve the electrical connection between the sleeve 34 and the holder portion 311, the electrically conductive adhesive 37 applied may cover only about a half or a quarter of the circumference, and the electrically conductive adhesive 37 may be applied either to a single location or to a plurality of locations circumferentially spaced from each other.

In this step of applying the adhesive 36 and the electrically conductive adhesive 37, the adhesives 36 and 37 may be discharged and applied simultaneously from two nozzles used for the adhesives 36 and 37, respectively, or alternatively, the adhesives 36 and 37 may be discharged and applied at separate times. Note that the simultaneous application of the adhesives 36 and 37 can preferably be accomplished in only a single step, with no need for two separate steps. This leads to a reduction in the curing time and the like as compared with in related art, and to improved productivity for the spindle motors 1.

Figure 5:
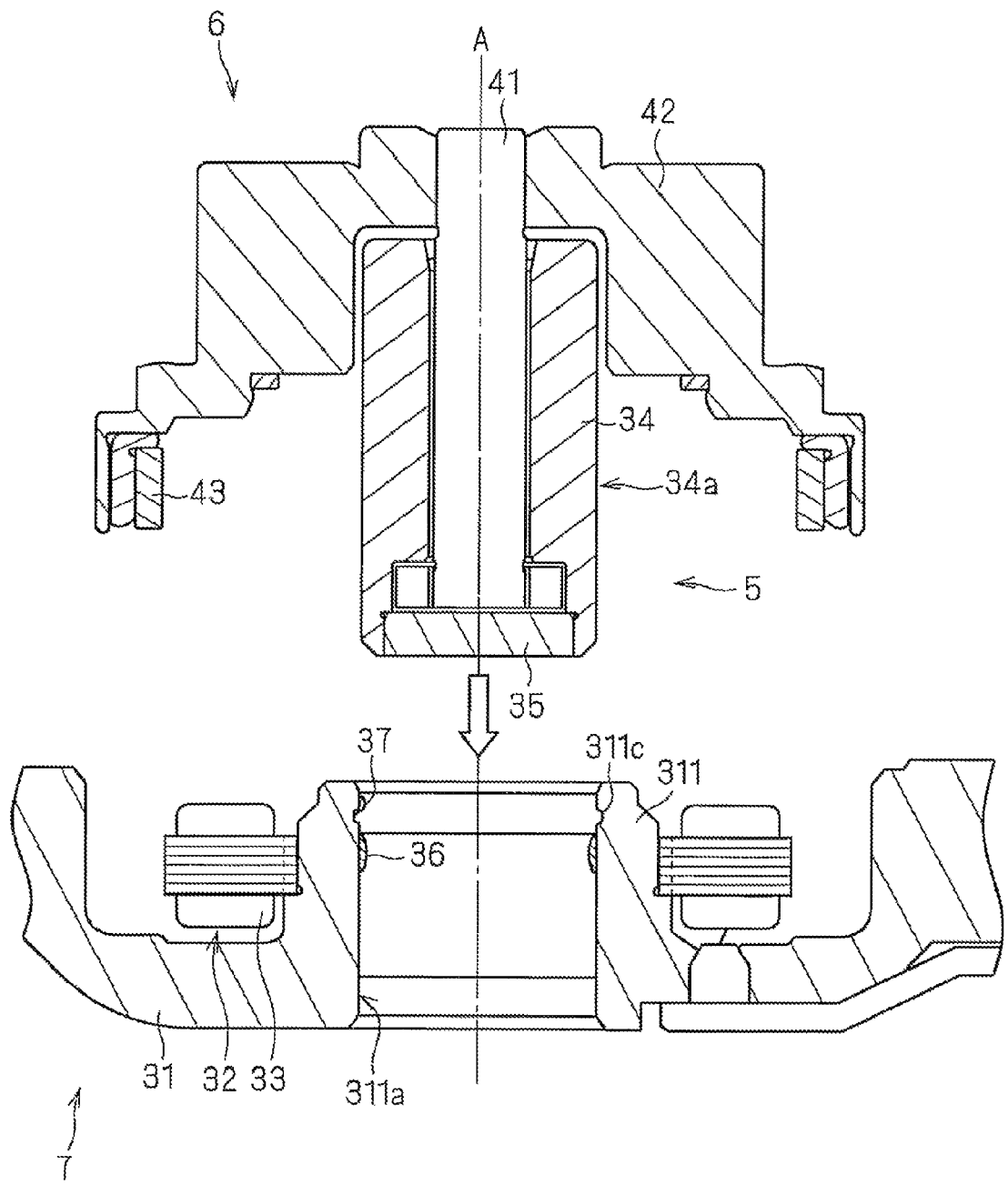
FIG. 5 is a cross-sectional view of the spindle motor according to a preferred embodiment of the present invention taken along a plane including the central axis, illustrating how the sleeve is inserted inside a holder portion.

After the application of the adhesive 36 and the electrically conductive adhesive 37 is completed in step S1, the sleeve 34 is inserted inside the inner circumferential surface 311a of the holder portion 311. In the present preferred embodiment, as illustrated in FIG. 5, the hub assembly 6 is moved downward from above the base assembly 7 along the axial direction, so that the sleeve 34 of the hub assembly 6 is inserted inside the holder portion 311 of the base assembly 7 (step S2). At this time, the electrically conductive adhesive 37 applied to the location above the groove portion 311c makes contact with the outer circumferential surface 34a of the sleeve 34 to be drawn into a film between the outer circumferential surface 34a of the sleeve 34 and the inner circumferential surface 311a of the holder portion 311. Moreover, a portion of the electrically conductive adhesive 37 is pushed downward and, when the sleeve 34 has been moved downward so far as to reach a certain axial position, is pushed into the groove portion 311c, so that the electrically conductive adhesive 37 is retained within the groove portion 311c. Furthermore, in step S2, the adhesive 36 makes contact with the outer circumferential surface 34a of the sleeve 34 to be drawn downward into a film between the outer circumferential surface 34a of the sleeve 34 and the inner circumferential surface 311a of the holder portion 311.

Next, the hub assembly 6 including the sleeve 34 is further moved downward inside the holder portion 311 of the base assembly 7 until the hub assembly 6 reaches a specified axial position. As a result, the adhesive 36 as drawn into a film in the minute clearance space SP is spread substantially evenly in the axial direction. Furthermore, a portion of the spread adhesive 36 is preferably retained within the lower opening portion 38 (see FIG. 3).

Thereafter, the hub assembly 6 including the sleeve 34 is retained at a specified axial position using a jig such as, for example, a chuck (step S3).

Thereafter, a process of curing the adhesive 36 and the electrically conductive adhesive 37 as retained between the sleeve 34 and the holder portion 311 is performed (step S4). In the present preferred embodiment, both the adhesive 36 and the electrically conductive adhesive 37 preferably are a thermosetting adhesive. Therefore, it is possible to cure the adhesive 36 and the electrically conductive adhesive 37 simultaneously, by placing the whole assembled unit including the hub assembly 6 and the base assembly 7 in a thermostat oven as a constant-temperature furnace and applying heat thereto.

The sleeve 34 is now completely fixed to the holder portion 311 after the curing process. Thereafter, the hub assembly 6 will never be axially displaced even if the hub assembly 6 is released from the retention by the aforementioned jig.

As described above, regarding the spindle motor 1 according to the present preferred embodiment, in the process of inserting the hub assembly 6 including the sleeve 34 inside the inner circumference of the holder portion 311, the adhesive 36 and the electrically conductive adhesive 37, both of which have the thermosetting property, are arranged to intervene in the minute clearance space SP between the holder portion 311 and the sleeve 34, and the adhesive 36 and the electrically conductive adhesive 37 are cured simultaneously by a single instance of heat treatment. Therefore, the assembling of the spindle motor 1 takes less time and can be accomplished in fewer steps than that of the related-art spindle motors.

Figure 7:
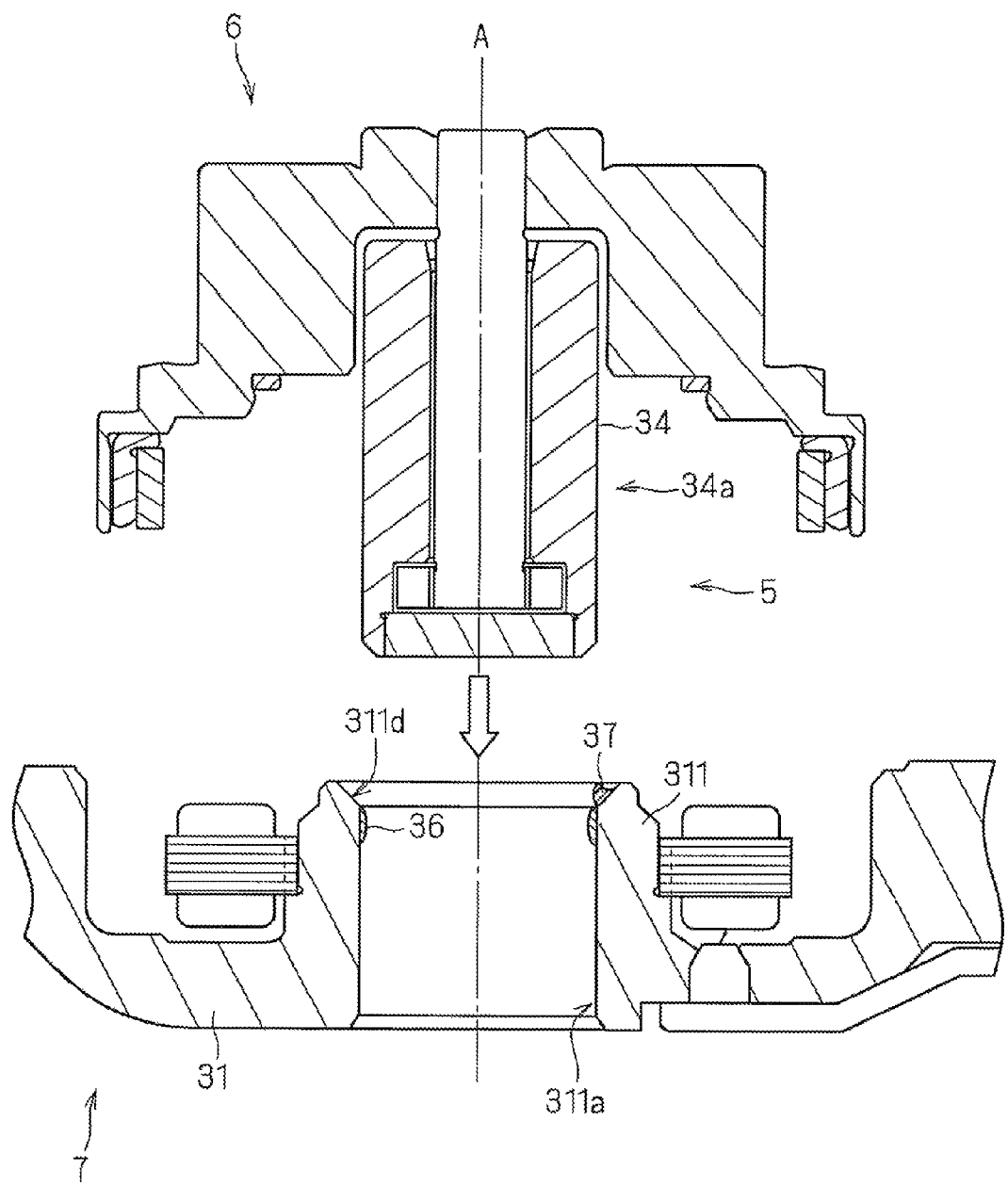
FIG. 7 is a cross-sectional view of the variation of the spindle motor according to a preferred embodiment of the present invention taken along a plane including the central axis, illustrating how the sleeve is inserted inside a holder portion.

FIGS. 6 and 7 illustrate a variation of the spindle motor 1. As illustrated in FIGS. 6 and 7, a chamfer portion 311d defined by an inclined plane may be provided at an inner top portion of the holder portion 311 to define an upper opening portion 39 of the minute clearance space SP, and the electrically conductive adhesive 37 may be arranged in the upper opening portion 39. As is the case with the groove portion 311c according to the above-described preferred embodiment, it is preferable that a minimum radial dimension of the upper opening portion 39 be greater than the maximum particle diameter of the electrically conductive particles contained in the electrically conductive adhesive 37. For example, in the case where the maximum particle diameter of the electrically conductive particles 371 is approximately 30 μm, the radial dimension of the upper opening portion 39 is preferably in the range of approximately 30 μm to approximately 300 μm.

In the case of the structure as illustrated in FIGS. 6 and 7, the electrically conductive adhesive 37 is applied to the upper opening portion 39, and the sleeve 34 is inserted inside the inner circumference of the holder portion 311, and thereafter the assembled unit is heated within the thermostat oven. As a result, the viscosity of the electrically conductive adhesive 37 decreases, and the electrically conductive adhesive 37 accordingly drips downward, so that the electrically conductive adhesive 37 comes into contact with the outer circumferential surface 34a of the sleeve 34 securely. As a result, the electrically conductive adhesive 37 is retained in the upper opening portion 39 defined by the chamfer portion 311d and the outer circumferential surface 34a of the sleeve 34. This contributes to ensuring an establishment of the electrical connection between the holder portion 311 of the base member 31 and the bearing unit 5 including the sleeve 34, resulting in excellent electrical connection between the two members.

As illustrated in FIG. 6, an upper opening edge (i.e., the chamfer portion 311d) of the holder portion 311 defines an inclined plane so that a radial dimension of the upper opening portion 39 gradually increases in the upward direction. Accordingly, when the sleeve 34 is inserted inside the inner circumference of the holder portion 311, the chamfer portion 311d can be used as a guide for the sleeve 34 to facilitate radial positioning of the sleeve 34 relative to the holder portion 311.

While preferred embodiments of the present invention have been described above, the present invention is not limited to the above-described preferred embodiments. For example, in the above-described preferred embodiments, the electrically conductive particles 371 preferably are metallic particles. Note, however, that equivalents of the electrically conductive particles 371 used in the above-described preferred embodiments can be obtained by adhering a metallic material similar to the aforementioned metallic particles of an electrically conductive material to surfaces of particles of an inorganic insulator such as alumina or glass, or to surfaces of particles of, for example, an organic polymer resin such as polyethylene or polystyrene, and forming an electrically conductive film layer therewith.

Also note that the electrically conductive material to be adhered to the surfaces is not limited to metals, but may be any of a variety of other materials, examples of which include carbon. Any method may be used to form the aforementioned electrically conductive film layer. Any of known methods may be adopted. Examples of such methods include physical deposition methods, such as electroless plating (or chemical plating), ion sputtering, ion plating, and vacuum deposition; a method of mechanically mixing fine powders of an electrically conductive material with base particles to adhere or fuse the fine powders to or with the base particles mechanochemically; and a method of mixing fine powders of an electrically conductive material with a binder, and coating the base particles with a paste obtained by the mixture.

The electrically conductive adhesive 37 used in the above-described preferred embodiment is an adhesive of a solventless reactive curing type, without a solvent. Note, however, that an electrically conductive adhesive containing a solvent may also be used in other preferred embodiments. A solvent contained in a volatile solvent-based, electrically conductive adhesive acts to greatly reduce the viscosity of a thermosetting adhesive resin and an electrically conductive adhesive, which contributes to accomplishing thin-layer coating. Note that the solvent is volatilized or evaporated by heating or the like when the electrically conductive adhesive is cured.

In the above-described preferred embodiment, the sleeve 34 and the cap 35 are preferably members separate from each other. Note, however, that this is not essential to the present invention, and that the sleeve and the cap may be arranged integrally with each other to form a single member, in other preferred embodiments.

Also note that, in other preferred embodiments, the sleeve 34 may be arranged inside a bearing housing which is substantially in the shape of a cylinder with a bottom, while an outer circumferential surface of the bearing housing and the inner circumferential surface of the holder portion are opposed to each other with the adhesive 36 arranged therebetween.

In the above-described preferred embodiment, when the hub assembly 6 and the base assembly 7 are assembled together, the hub assembly 6 is moved toward the base assembly 7 staying at a fixed position. Note, however, that this is not essential to the present invention. For example, the base assembly 7 may be moved toward the hub assembly 6 staying at a fixed position, in other preferred embodiments.

Suppose that the electrically conductive adhesive 37 has a high viscosity, and that after the highly viscous electrically conductive adhesive is applied to the location above the groove portion 311c on the inner circumferential surface 311a of the holder portion 311, the sleeve is inserted from above. In this case, the electrically conductive adhesive may be dragged downward by the outer circumferential surface of the sleeve until a portion of the electrically conductive adhesive juts out from the lower opening portion of the minute clearance space defined between the inner circumferential surface of the holder portion and the outer circumferential surface of the sleeve. This may lead to a failure in the electrical connection therebetween. In order to avoid this problem, an appropriate amount of highly viscous electrically conductive adhesive may be applied to within the groove portion in advance. This adhesive applied in advance acts as an impediment against the dragging of the electrically conductive adhesive by the outer circumferential surface of the sleeve during the insertion of the sleeve.

In the above-described preferred embodiments, the adhesive 36 arranged between the sleeve and the holder portion to join them to each other preferably is composed of a single type of adhesive, for example. Note, however, that two or more types of adhesive may be arranged between the sleeve and the holder portion to join them to each other, in other preferred embodiments. For example, a UV-curing adhesive may be arranged at the lower opening portion, where irradiation of ultraviolet rays is easy, while a thermosetting adhesive or an anaerobic adhesive may be arranged in the clearance space between the outer circumferential surface of the sleeve and the inner circumferential surface of the holder portion, where it is hard for the ultraviolet rays to reach. Also, an adhesive composed of a mixture of two types of adhesive components may be used.

In step S4 in the above-described preferred embodiment, so-called breathing, i.e., vaporization of a volatile component of the adhesive, can be accomplished by placing the whole assembled unit composed of the hub assembly 6 and the base assembly 7 in the thermostat oven and applying heat thereto. If the adhesive were left uncured, the volatile component might be vaporized during the drive of the disk drive apparatus 2 to generate outgas, resulting in smearing of the apparatus with the outgas. In order to avoid this problem, even in the case where the adhesive is an anaerobic adhesive, a UV-curing adhesive, or other suitable adhesive, the whole assembled unit including the hub assembly 6 and the base assembly 7 is placed within the thermostat oven set at a higher temperature than a temperature of the disk drive apparatus 2 in operation, to expel the volatile component of the adhesive out of the spindle motor.

In the above-described preferred embodiment, the assembled unit including the hub assembly 6 and the base assembly 7 is placed in the thermostat oven and subjected to the heat treatment. Note, however, that this is not essential to the present invention. For example, the adhesive may be heated by high-frequency induction heating, in other preferred embodiments. Specifically, a one-part thermosetting adhesive of a fast-cure type is applied to the inner circumferential surface of the holder portion, and the sleeve is inserted inside the inner circumference of the holder portion. Then, a heater arranged in contact with or in close vicinity to a back of the base member is used to heat surroundings of the holder portion of the base member. This heater preferably includes an induction coil, and a bottom portion of the base member including the surroundings of the holder portion is heated by the high-frequency induction heating using the induction coil. The high-frequency induction heating accomplishes the heating of the surroundings of the holder portion easily. Moreover, since the thermosetting adhesive used here is of the fast-cure type, provisional fixing of the sleeve and the base member to each other is accomplished in a short time and with sufficient strength. Furthermore, since the thermosetting adhesive used here is preferably a one-part adhesive, the manufacturing procedure is simplified as compared with the case where a two-part adhesive is used instead. Thus, a reduction in cost of the manufacturing of the spindle motor is achieved. In terms of the property of the fast-cure type, the curing time measured when the adhesive is subjected to a curing time test defined under Japanese Industrial Standards (JIS) C6521-1996 is preferably about 15 seconds or less at about 110° C., for example.

In the above-described preferred embodiment, the fixing adhesive 36 and the electrically conductive adhesive 37 are applied to the inner circumferential surface 311a of the holder portion 311. Note, however, that this is not essential to the present invention. For example, as long as the electrical connection between the sleeve 34 and the holder portion 311 is established, one of the adhesives 36 and 37 may be applied to the outer circumferential surface of the sleeve while the other adhesive is applied to the inner circumferential surface of the holder portion, in other preferred embodiments. Also, both the fixing adhesive and the electrically conductive adhesive may be applied to the outer circumferential surface of the sleeve, in other preferred embodiments.

In the above-described preferred embodiments, the groove portion 311c is preferably provided on the inner circumferential surface 311a of the holder portion 311, and the electrically conductive adhesive 37 is preferably retained within the groove portion 311c. Note, however, that this is not essential to the present invention. For example, the electrically conductive adhesive may be retained within a groove portion provided on the outer circumferential surface of the sleeve, in other preferred embodiments.

In the above-described preferred embodiments, a thermosetting electrically conductive adhesive is preferably used as the electrically conductive adhesive 37. Note, however, that this is not essential to the present invention. For example, an electrically conductive adhesive containing an externally stimulated curing material, such as a UV-curing material or a visible light curing material, or an anaerobic curing material may be used, in other preferred embodiments. As the joining-use adhesive 36 also, a UV-curing anaerobic adhesive, a UV-curing and thermosetting adhesive, an anaerobic thermosetting adhesive, or the like may be used, in other preferred embodiments.

The present invention may preferably be applicable to spindle motors designed to rotate a disk about a central axis thereof, disk drive apparatuses including such a spindle motor, and methods of manufacturing such spindle motors, for example.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A spindle motor comprising:
   a shaft arranged in a vertical direction along a central axis;
   a base member including a substantially cylindrical holder portion arranged around the central axis;
   a bearing unit arranged radially inward of the holder portion; and
   a rotating portion including a mounting surface on which a disk is to be mounted, the rotating portion being arranged above the base member to rotate about the central axis;
   wherein a portion of an adhesive containing an electrically conductive material and a portion of an adhesive containing an externally stimulated curing material and/or an anaerobic curing material are arranged in a clearance space defined between a radially innermost circumferential surface of the holder portion and a radially outermost circumferential surface of the bearing unit;
   the adhesive containing the electrically conductive material is arranged above the adhesive containing the externally stimulated curing material and/or the anaerobic curing material;
   a lower opening is defined between a lower radially inner surface of the holder portion and a lower radially outer surface of the bearing unit, the lower opening having a radial dimension that is greater than a radial dimension of the clearance space;
   the adhesive containing the electrically conductive material is arranged only in one or more portions of the clearance space in a circumferential direction such that the bearing unit is not completely surrounded by the adhesive containing the electrically conductive material in the circumferential direction; and
   a total amount of the adhesive containing the electrically conductive material is smaller than a total amount of the adhesive containing an externally stimulated curing material and/or an anaerobic curing material.

2. The spindle motor according to claim 1, wherein
   the holder portion includes a groove portion extending in a circumferential direction provided on the inner circumferential surface thereof, the groove portion retaining therein some of the adhesive containing the electrically conductive material;
   the adhesive containing the electrically conductive material includes an adhesive material and electrically conductive particles dispersed in the adhesive material; and
   a radial dimension of the groove portion is greater than a maximum particle diameter of the electrically conductive particles.

3. The spindle motor according to claim 2, wherein the radial dimension of the groove portion is in a range of about 30 μm to about 300 μm.

4. The spindle motor according to claim 1, wherein
   the holder portion includes a chamfer portion arranged at an inner top portion thereof to define an upper opening portion of the clearance space; and
   the adhesive containing the electrically conductive material is retained in the upper opening portion.

5. The spindle motor according to claim 4, wherein a radial dimension of the upper opening portion is in a range of about 30 μm to about 300 μm.

6. The spindle motor according to claim 4, wherein
   the adhesive containing the electrically conductive material includes an adhesive material and electrically conductive particles dispersed in the adhesive material; and
   a minimum radial dimension of the upper opening portion is greater than a maximum particle diameter of the electrically conductive particles.

7. The spindle motor according to claim 6, wherein a radial dimension of the upper opening portion is in a range of about 30 μm to about 300 μm.

8. The spindle motor according to claim 2, wherein the maximum particle diameter of the electrically conductive particles is in a range of about 1 μm to about 30 μm.

9. The spindle motor according to claim 1, wherein the adhesive containing the externally stimulated curing material and/or the anaerobic curing material is a UV-curing adhesive or a thermosetting adhesive.

10. A disk drive apparatus comprising:
    the spindle motor of claim 1;
    an access portion including a head portion arranged to read information from and/or write information to the disk mounted on the rotating portion of the spindle motor; and
    an apparatus housing arranged to contain the spindle motor and the access portion.

* * * * *